Feb. 9, 1932.                W. PAGE                1,844,072
                       FLUID OPERATIVE CONTROL
                       Filed May 17, 1930        2 Sheets-Sheet 1
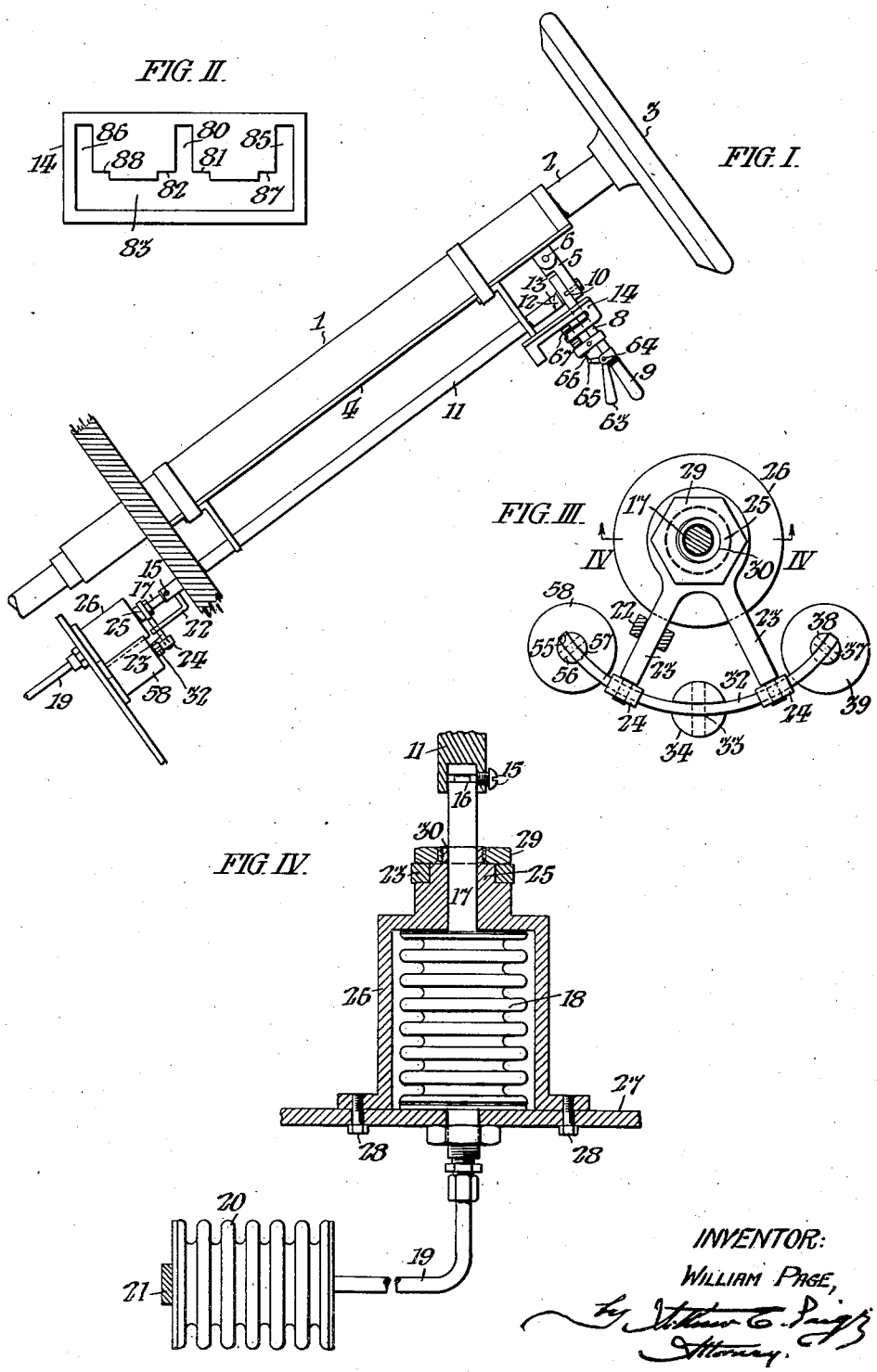
INVENTOR:
WILLIAM PAGE, Feb. 9, 1932.    W. PAGE    1,844,072
FLUID OPERATIVE CONTROL
Filed May 17, 1930    2 Sheets-Sheet 2
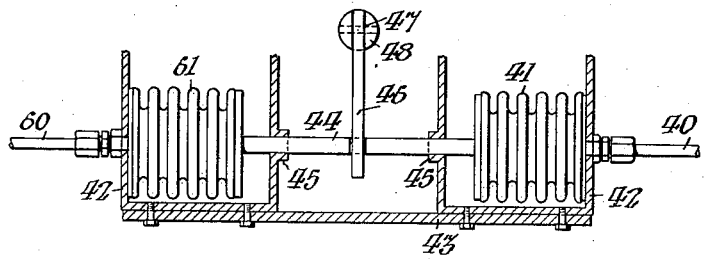
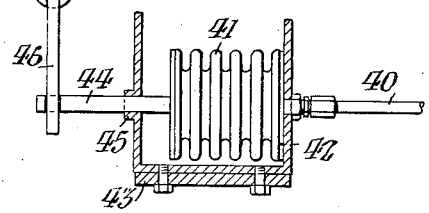
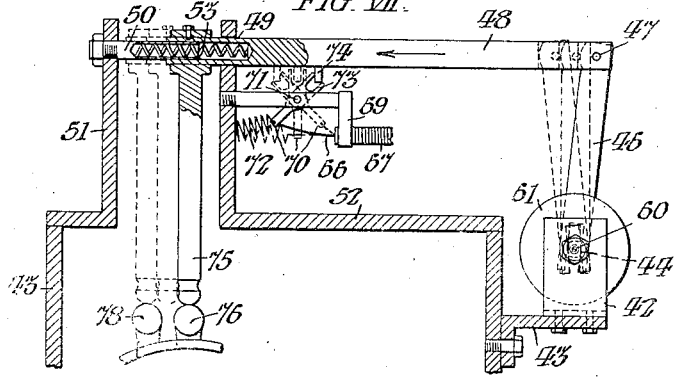
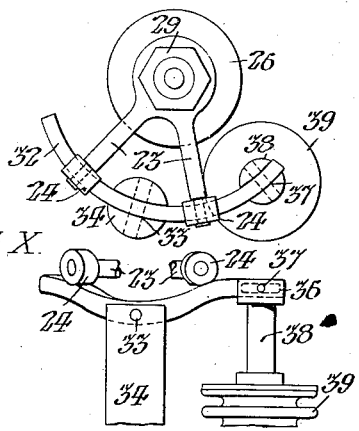
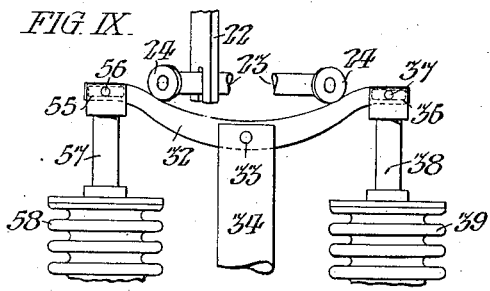
INVENTOR:
WILLIAM PAGE, Patented Feb. 9, 1932

1,844,072

UNITED STATES PATENT OFFICE

WILLIAM PAGE, OF PHILADELPHIA, PENNSYLVANIA

FLUID OPERATIVE CONTROL

Application filed May 17, 1930. Serial No. 453,175.

The purpose of the invention is to substitute for the ordinary mechanical controlling means for automotive vehicles, including foot pedals and means connecting them with the clutch, gear changing, and brake mechanism; a hand lever local to the steering wheel, and a fluid conduit connecting the same with the mechanism to be controlled, with the advantage of not only avoiding the obstruction of the floor space in front of the operator's seat by the controlling devices, but permitting the desired control to be effected with less muscular exertion than is required by said ordinary mechanical controlling devices.

As hereinafter described, the preferred embodiment of my invention includes a fluid conduit having collapsible bellows at each end thereof forming a sealed system containing a mobile liquid which does not freeze at ordinary winter temperatures, whereby deformation of a bellows local to the operator effects deformation of a bellows remote from the operator to effect the desired control by displacement of said fluid within the system.

Fluid operative controls of the generic form thus described are the subject matter of my copending application Serial No. 446,269 filed April 22, 1930.

The form of my invention hereinafter described is particularly adapted for use on heavy duty trucks, and relates particularly to means for coordinately operating, in proper sequence, the vehicle clutch and change gears which require more power for their operation than the clutch and change gears of pleasure vehicles.

As hereinafter described, the gear shifting controls include two such bellows systems adapted to be alternately expanded and collapsed by coordinate relation with a single lever which is fulcrumed intermediate of its opposite ends which are respectively connected with the initial bellows of the two systems.

As hereinafter described, a single operating lever may be used in conjunction with a plurality of such conduits, respectively provided with bellows at opposite ends thereof, to release the clutch and shift the gears and restore the clutch to its operative position; said lever being provided with a handle in coordinate relation with an auxiliary handle upon an auxiliary lever, carried by the main lever and adapted to pull a flexible connector when the two handles are grasped and pressed together, to selectively position a member of the gear shifting mechanism so that the power initially applied to the bellows conduit by the main lever may be selectively applied to effect different changes in the gears, in accordance with the manipulation of said auxiliary lever.

As hereinafter described; such bellows may be tubes of thin metal having a plurality of axially spaced circumferential corrugations. However, suitable bellows may be otherwise formed and in some instances cylinders and pistons may be substituted for bellows.

My invention includes various novel features of construction and arrangement hereinafter more definitely specified.

In said drawings; Fig. I is a diagram of an automobile steering column and its appurtenances embodying this invention adapted to be manipulated by the main and auxiliary levers above contemplated.

Fig. II is a plane development of the arcuate guide plate for said main lever, indicated in Fig. I.

Fig. III is a plan view of the group of initial bellows and their common actuating means indicated in Fig. I.

Fig. IV is a fragmentary sectional view taken on the line IV, IV, in Fig. III, through the clutch bellows.

Fig. V is a longitudinal sectional view showing two bellows with means mechanically coupling them for coordinate reciprocation, in cooperative relation with a gear shifting lever; said bellows being respective terminals of two systems of which the initial bellows are respectively indicated at opposite ends of the arcuate lever in Fig. III.

Fig. VI is a longitudinal sectional view of a simplified form of the device shown in Fig. V, and wherein the gear shifting lever is adapted to be actuated by but one bellows similar to that shown at the right hand side of Fig. V.

Fig. VII is a diagrammatic view, partly in vertical section, showing the gear shifting lever indicated in Figs. V and VI, the rock shaft which carries it, and the gear shifting mechanism appurtenant thereto; said shaft being axially reciprocatory by means of the flexible connector which is operative by the auxiliary lever shown in Fig. I, and a spring.

Fig. VIII is a plan view, similar to Fig. III, but showing a simplified form of my invention wherein the arcuate lever is adapted to operate but one bellows which is pivotally connected with the right hand end thereof.

Fig. IX is a plane development of the arcuate lever and its appurtenances indicated in Fig. III, showing its coordinate relation with the initial bellows of the two conduit systems indicated in said figure.

Fig. X is a plane development of the arcuate lever and its appurtenances indicated in Fig. VIII, showing its coordinate relation with the initial bellows of the single conduit system indicated in said figure.

Referring to Fig. I; the stationary steering column 1 has the steering shaft 2 mounted to turn therein and provided with the steering wheel 3 at the top thereof. The bracket 4 which is rigidly connected with said steering column 1, but may be otherwise supported, has the lever 5 fulcrumed at 6 therein. Said lever 5 carries the lever 8 provided with the handle 9 which has the fulcrum 10 coincident with the axis of the rod 11, which is engaged by the lug 12 extending in the slot 13, so that said rod may be moved axially, in said bracket 4, by movement of said lever 8 on said fulcrum 6, and be turned by movement of said lever 8 on its fulcrum 10. Said lever 8 may be detained in any selected position by the guide plate 14, as hereinafter described.

Said rod 11 has the coupling screw 15 at its lower end for engagement in the annular groove 16 in the plunger 17 which, as indicated in Fig. IV, is operatively connected with the upper end of the bellows 18 which is the initial bellows of the system including the conduit 19 having the terminal bellows 20 in cooperative relation with the clutch releasing lever 21. Said coupling 15 and 16 permits said rod to be axially shifted to compress said bellows, and to be turned without twisting the bellows plunger 17. Said rod 11 carries the fork 22 embracing one arm of the lever 23, which has two similar arms in circumferentially spaced relation, each carrying a roller 24. Said lever 23 is fulcrumed upon the axial sleeve 25 which is fixed upon the stationary bellows casing 26 which is rigidly connected with the base plate 27 by the bolts 28. Said lever 23 is held against upward displacement by the nut 29 engaging the thread 30 of said sleeve. The construction and arrangement are such that said lever 23 may be turned by turning movement of said hand lever 8, to cause said rollers 24 to traverse the arcuate lever 32 which, as indicated in Figs. III and IX, is fulcrumed at 33 in the standard 34 on said base plate 27.

Said lever 32 has the slot 36 in its right hand end for engagement with the pivot pin 37 in the plunger 38 of the bellows 39, the lower end of which is rigidly connected with said base plate 27. Said bellows 39 is the initial bellows of the fluid controlling system including the conduit 40 and the terminal bellows 41 connected therewith. As shown in Fig. V, said bellows 41 is rigidly connected at its right hand end with the stationary frame 42 and has its left hand end operatively connected with the coupling rod 44 which is mounted to reciprocate in the bearings 45 in said frame 42. Said frame 42 is conveniently rigidly connected with the transmission gear casing 43, as shown in Fig. VII.

Said rod 44 is operatively connected with the free end of the gear shifting lever 46 which is fulcrumed at 47 in the gear shifting rock shaft 48. As shown in Fig. VII; said shaft 48 is mounted to reciprocate and rock respectively in and on the axially alined bearings 49 and 50 in the housing 51 on the cover 52 of said transmission gear casing 43. Said bearing 50 is tubular and incloses the spring 53 which continually tends to thrust said rock shaft 48 axially to the right in Fig. VII. However, said shaft 48 may be axially shifted in the opposite direction by means hereinafter described.

As shown in Figs. III and IX; the left hand end of said arcuate lever 32 has the slot 55 for engagement with the pivot pin 56 in the plunger 57 of the bellows 58, the lower end of which is rigidly connected with said base plate 27. Said bellows 58 is the initial bellows of the fluid controlling system, including the conduit 60 and the terminal bellows 61 connected therewith. As shown in Fig. V, said bellows 61 is rigidly connected at its left hand end with said frame 42, and has its right hand end operatively connected with said coupling rod 44. The construction and arrangement of said two systems, including the terminal bellows 41 and 61, are such that said lever 46 and the rock shaft 48 which carries it may be oscillated by alternate expansion and contraction of said terminal bellows 41 and 61 as a consequence of the alternate contraction and expansion of said initial bellows 39 and 58 by the turning movement of the lever 23 with its circumferentially spaced rollers 24 bearing upon said arcuate lever 32 under the lateral pressure exerted by the operator upon said lever 8, which lever 8, as above noted, is adapted to release the clutch before effecting any movement of the gear changing mechanism;

so as to avoid any operation of the latter while the clutch is engaged.

As my copending application aforesaid discloses similar mechanism including an arcuate lever adapted to be rocked by a single roller carried by a lever arm; it may be observed that the substitution of the lever 23 having two rollers 24 in circumferentially spaced relation with reference to the arcuate lever 32, is advantageous in that less turning movement of the lever 23 is required to effect the operation of the lever 32 than if said lever 23 had but one arm provided with a single roller 24.

In order to enable the operator to axially shift said gear shifting rock shaft 48 in coordinate relation with movements of the hand control lever 8; I provide the auxiliary hand control lever 63 which, as indicated in Fig. I, is fulcrumed at 64 upon said main lever 8 and is pivotally connected at 65 with the slide wire 66 which is mounted to reciprocate in the tubular sheath 67 which is conveniently formed of a wire spirally wound like a close spring. As shown in Fig. VII, the other end of said tubular sheath 67 is secured in the bracket 69 on said housing 51 and said slide wire 66 extends through said bracket in operative connection with the lever 70 which is fulcrumed at 71 on said bracket and provided with the tension spring 72 which supplements the action of said spring 53 in normally holding said lever 70 and the auxiliary hand lever 63 in the position shown respectively in said Figs. VII and I. The upper end of said lever 70 is bifurcated, as indicated at 73 in Fig. VII, for engagement with the pendent lug 74 on said rock shaft 48, and the construction and arrangement are such that when said main handle 9 and auxiliary handle 63 are gripped by the operator and pressed together, said wire 66 is pulled to shift said rock shaft 48 in the direction of the arrow marked thereon in Fig. VII. When said auxiliary handle 63 is released, by the operator, said spring 53, shown in Fig. VII, restores said rock shaft 48 to the position shown in full lines in that figure.

Said gear shifting rock shaft 48 carries the gear actuating arm 75 which is normally held, by said spring 53, in the position shown in full lines in Fig. VII, in which position said arm is in registry with the gear shifting rod 76 which is adapted to position the change gears for second and third speed transmission, in accordance with whether said rod is shifted toward or away from the observer with reference to Fig. VII. However, by the above described movement of the auxiliary handle 63, said gear actuating arm 75 may be shifted to register with the gear shifting rod 78 which is adapted to position the change gears for first speed or reverse transmission, in accordance with whether said rod is shifted toward or away from the observer with reference to Fig. VII. Said gear actuating arm 75 is in neutral position when it is shifted by said rock shaft 48 to a position intermediate of its positions of registry respectively with said shifting rods 76 and 78, as indicated in dotted lines in Fig. VII. In other words; said gear actuating arm 75 may be shifted into five different positions which are characteristic of the so-called H type of gear shifting devices, and said guide plate 14, shown in Fig. II, is adapted to hold the gear shifting mechanism in any one of those positions, as follows:

Said guide plate 14 is arcuate in concentric relation with the fulcrum 10 of the main hand lever 8, and the axis of the rod 11 which is coincident therewith, but as shown in the plane development thereof in Fig. II, said plate has the slot 80 at the top of which said lever arm 8 normally rests when the mechanism is in neutral position, with the clutch engaged. When said lever arm 8 is pushed downward in said slot 80, the clutch is disengaged, and may be detained in such position by said lever 8, when the latter is engaged in either of the detent notches 81 or 82 in said plate. Said plate 14 has the longitudinal slot 83 connecting said central slot 80 with the slots 85 and 86 at respectively opposite ends of said plate, which slots have respective detent notches 87 and 88 at the lower ends thereof. Said lever 8 being in the upper end of said slot 80 in the plate 14, may be depressed into the slot 83 to disengage the clutch, and if the auxiliary hand lever 63 is then gripped (by the same hand of the operator) to pull the wire 66, and said lever 8 is then shifted to the right in said slot 83 to the slot 85, the gears are shifted to transmit power at the first, i. e., lowest speed of operation of the automobile, and said lever 8 may be detained in the notch 87 with the clutch disengaged in that position of the gears, or the clutch may be engaged by permitting said lever 8 to rise to the top of said slot 85. Said lever 8 may, of course, thereafter be lowered to disengage the clutch and detain the lever in the notch 87, with the clutch disengaged, or said lever 8 may be restored to its original position at the top of the slot 80 in which position the clutch is engaged but the change gears are in neutral idle position. If the lever 8 be lowered to the slot 83 and, with the auxiliary hand lever gripped to pull the wire 66, be then shifted to the left in said slot 83 into engagement with the notch 88; the gears are then in position for reverse operation of the automobile but the clutch is disengaged. The clutch may be engaged with the gears in that reverse position by shifting the lever 8 to the top of the notch 86. Of course, said lever 8 may be thereafter restored to its original neutral position at the top of the slot 80.

However, if, with the auxiliary hand control lever 63 released, said lever 8 be lowered, from said neutral position, to the slot 83, and moved therein to the right into engagement with the notch 87, it effects the shifting of the gears to the second speed position, but with the clutch disengaged. The clutch may be engaged with the gears in said second position by permitting the hand control lever 8 to rise to the top of said slot 85. Moreover, if, with the auxiliary hand control lever 63 released, said main lever 8 be lowered to said slot 83 and turned to the left into engagement with the notch 88; the change gears are thereby shifted into the position of transmission of power at third speed, but with the clutch disengaged. The clutch may be engaged with the gears in that third position by shifting said lever 8 to the top of the slot 86.

As above explained with reference to Fig. V, the use of two fluid control systems respectively provided with the terminal bellows 41 and 61 is preferable for the control of heavy duty vehicles, such as trucks. However, in Fig. VI, I have shown a simplified form of the structure indicated in Fig. V, differing from the latter in that the bellows 61 is omitted, with its appurtenances including the left hand end of the coupling rod 44, which, in Fig. V, is provided to operate said bellows 61.

Fig. VIII shows an arcuate lever controlling mechanism similar to that shown in Fig. III, except that the lever is operative upon but one bellows, and such a device may be used in conjunction with the mechanism shown in Fig. VI.

In both forms of my invention shown in Figs. III and IX, and VIII and X, the arcuate lever 32 is upwardly inclined at opposite sides of its fulcrum 33 to cooperate with the pair of rollers 24; such inclination may be varied in accordance with the amount of lateral displacement of the lever 23 and the amount of axial displacement of the bellows connected with said arcuate lever 32, which may be desired or required.

As above noted; cylinders and pistons may be substituted for bellows in closed fluid control systems such as above described. Moreover, it is obvious that various modifications may be made in the details of construction, arrangement, and method of procedure above described without departing from the essential features of my invention, as defined in the appended claims.

I claim:

1. In fluid operative controlling apparatus for automative vehicles, a closed system including a conduit; a mobile fluid in said conduit; means at the initial end of said conduit whereby said fluid may be displaced in said conduit, to transmit power therethrough; means at the distal end of said conduit adapted to be moved by displacement of the fluid; and means appurtenant to the fluid movable means at the distal end of said conduit, movable to vary the application of the power transmitted through said conduit to different elements of the vehicle; whereby a plurality of different movable elements of the vehicle may be controlled by power transmitted through said single conduit; including means operable at the initial end of said conduit to vary the application of the power transmitted through said conduit, at the distal end thereof.

2. In fluid operative controlling apparatus for automotive vehicles, a closed system including a conduit; a mobile fluid in said conduit; means at the initial end of said conduit whereby said fluid may be displaced in said conduit, to transmit power therethrough; means at the distal end of said conduit adapted to be moved by displacement of the fluid; and means appurtenant to the fluid movable means at the distal end of said conduit, movable to vary the application of the power transmitted through said conduit to different elements of the vehicle; whereby a plurality of different movable elements of the vehicle may be controlled by power transmitted through said single conduit; including means operable at the initial end of said conduit to vary the application of the power transmitted through said conduit, at the distal end thereof, including a mechanically operative flexible connector and means movable to reciprocate said connector.

3. In fluid operative controlling apparatus for automotive vehicles, a closed system including a conduit; a mobile fluid in said conduit; means at the initial end of said conduit whereby said fluid may be displaced in said conduit, to transmit power therethrough; means at the distal end of said conduit adapted to be moved by displacement of the fluid; and means appurtenant to the fluid movable means at the distal end of said conduit, movable to vary the application of the power transmitted through said conduit to different elements of the vehicle; whereby a plurality of different movable elements of the vehicle may be controlled by power transmitted through said single conduit; including a main hand control lever at the initial end of the conduit, adapted to effect displacement of the fluid in said conduit; and an auxiliary hand control lever local to said main lever, movable to vary the application of said power; whereby both of said levers may be actuated by one hand of the operator to coordinately transmit power and selectively apply it.

4. In fluid operative controlling apparatus for automotive vehicles, a closed system including a conduit; a mobile fluid in said conduit; means at the initial end of said conduit whereby said fluid may be displayed in said conduit, to transmit power therethrough;

means at the distal end of said conduit adapted to be moved by displacement of the fluid; and means appurtenant to the fluid movable means at the distal end of said conduit, movable to vary the application of the power transmitted through said conduit to different elements of the vehicle; whereby a plurality of different movable elements of the vehicle may be controlled by power transmitted through said single conduit; including an axially movable rock shaft, a gear actuating arm on said shaft; a lever carried by said shaft, and means whereby said lever may be rocked by displacement of the fluid in said conduit; and means extending from said rock shaft to the initial end of said conduit, movable to axially shift said rock shaft; whereby axial and oscillatory movements of said rock shaft may be selectively effected in coordinate relation, to variably shift said arm.

5. In fluid operative controlling apparatus for automotive vehicles, a closed system including a conduit; a mobile fluid in said conduit; means at the initial end of said conduit whereby said fluid may be displaced in said conduit, to transmit power therethrough; means at the distal end of said conduit adapted to be moved by displacement of the fluid; and means appurtenant to the fluid movable means at the distal end of said conduit, movable to vary the application of the power transmitted through said conduit to different elements of the vehicle; whereby a plurality of different movable elements of the vehicle may be controlled by power transmitted through said single conduit; including an axially movable rock shaft, a gear actuating arm on said shaft; a lever carried by said shaft, and means whereby said lever may be rocked by displacement of the fluid in said conduit; and means including a wire extending from said rock shaft to the initial end of said conduit; a lever, and a spring, movable to axially shift said rock shaft; whereby axial and oscillatory movements of said rock shaft may be selectively effected in coordinate relation, to variably shift said arm.

6. In fluid operative controlling apparatus for automotive vehicles; a closed system including a conduit; a mobile fluid in said conduit; means at the initial end of said conduit whereby said fluid may be displaced in said conduit, including a bellows; a lever cooperatively connected with said bellows; a pair of rollers in spaced relation adapted to traverse said lever; and means arranged to shift said rollers in operative relation with said lever and adapted to thereby alternately compress and distend said bellows.

7. Apparatus as in claim 6; wherein the lever is fulcrumed intermediate of its ends, and including a bellows at each end of said lever; whereby said bellows may be compressed and expanded in alternation.

8. In fluid operative controlling apparatus, the combination with a bellows lever having inclined portions upon respectively opposite sides of its fulcrum; of bellows pivotally connected to one end of said lever; a pair of rollers in spaced relation, adapted to traverse said lever toward and away from its fulcrum, upon opposite sides thereof, and thereby rock said lever; and means carrying said rollers and maintaining them in predetermined spaced relation throughout their movement.

9. In fluid operative controlling apparatus, the combination with a bellows lever having inclined portions upon respectively opposite sides of its fulcrum; of bellows pivotally connected to one end of said lever; a pair of rollers in spaced relation, adapted to traverse said lever toward and away from its fulcrum, upon opposite sides thereof, and thereby rock said lever; and means carrying said rollers and maintaining them in predetermined spaced relation throughout their movement, including a lever having a fulcrum, axis transverse to the axis of said bellows lever, said bellows lever being arcuate, in concentric relation with the axis of said roller carrying lever.

10. In fluid operative controls; the combination with two bellows; of an axially reciprocatory rod adapted to be moved to deform one of said bellows, and capable of turning; a fork carried by said rod; a lever fulcrumed in coaxial relation with said rod, and adapted to operate the other of said bellows when turned; said lever being fitted in said fork; whereby said lever may be operated to operate said second bellows by turning movement of said rod in cooperative relation with said first bellows.

11. Apparatus as in claim 10; wherein said lever carries a roller mounted to rotate in a plane transverse to the length of said lever.

12. Apparatus as in claim 10; wherein said lever carries a roller mounted to rotate in a plane transverse to the length of said lever; and including an arcuate lever forming a path for said roller intersecting the axis of said second bellows; whereby power applied to said roller lever by said fork may be multiplied in its application to said second bellows.

13. Fluid operative controlling apparatus for automobiles, including a plurality of initial bellows, respective conduits leading from said bellows, and respective bellows at the distal ends of said conduits, forming separate closed systems; separate mobile fluids in each of said systems; and means arranged and adapted for cooperative deformation of said plurality of initial bellows, to thereby operate said distal bellows, including an axially reciprocatory and rotary rod, in alinement with one of said initial bellows, and a cam device carried by said rod in eccentric relation with the latter and adapted to register with another of said initial bellows; and means operatively connected with said rod adapted to effect axial reciprocation and rotation of said rod; whereby said rod may be manipulated to operate a plurality of said bellows simultaneously and in alternation.

14. In fluid operative controlling apparatus for automobiles, the combination with a rod adapted and arranged for axial reciprocation and rotation; of a cam device carried by said rod in eccentric relation therewith; an arcuate lever positioned to register with said cam device throughout the range of rotary movement of said rod; said lever being fulcrumed intermediate of its length; a bellows in operative relation with one end of said arcuate lever; a conduit extending from that bellows, and another bellows at the distal end of said conduit and forming a closed system therewith; and a mobile fluid in said system; whereby said rod and cam device may be operated to selectively move either end of said arcuate lever and thereby compress and distend the bellows connected therewith; whereby the bellows at the distal end of said conduit is correspondingly deformed by displacement of said fluid.

15. In fluid operative controlling apparatus for automobile change gears; the combination with a change gear lever; of a plurality of bellows in cooperative relation with said lever; conduits leading from the respective bellows; respective bellows at the other ends of said conduits; said bellows and conduits forming separate systems; separate mobile fluids in each of said systems; and means, in cooperative relation with the bellows remote from said lever, arranged and adapted to selectively deform those bellows and thereby selectively operate the bellows local to said lever to effect the desired change of gears.

16. In fluid operative controlling apparatus for automobiles; the combination with a steering column; of bearings mounted on said column respectively local to the steering wheel and remote therefrom; a rod arranged and adapted for axial reciprocation and rotation in said bearings; a lever fulcrumed local to the steering wheel, upon an axis transverse to said rod; a lever arm pivotally connected with said rod and with said lever, capable of universal motion, and arranged and adapted to axially reciprocate and turn said rod; a group of bellows at the lower end of said rod, including a central bellows and a series of bellows disposed in an arc concentric with said central bellows; and a cam device carried by said rod in cooperative relation with said group of bellows; whereby said bellows may be selectively deformed by manipulation of said lever and rod.

In testimony whereof, I have hereunto signed my name at Philadelphia, Pennsylvania, this 12th day of May, 1930.

WILLIAM PAGE.